US012580599B2

(12) United States Patent　　　　(10) Patent No.:　US 12,580,599 B2
Keller　　　　　　　　　　　　　　(45) Date of Patent:　Mar. 17, 2026

(54) VARIABLE DELAY FIR FILTER FOR REFLECTION EQUALIZATION

(71) Applicant: TEXAS INSTRUMENTS INCORPORATED, Dallas, TX (US)

(72) Inventor: Robert C. Keller, Friedrichshafen (DE)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 490 days.

(21) Appl. No.: 18/089,876

(22) Filed: Dec. 28, 2022

(65) Prior Publication Data

US 2024/0063834 A1　　Feb. 22, 2024

Related U.S. Application Data

(60) Provisional application No. 63/398,948, filed on Aug. 18, 2022.

(51) Int. Cl.
H04B 1/04　　　　(2006.01)
H04B 1/525　　　(2015.01)
H04B 1/7115　　(2018.01)

(52) U.S. Cl.
CPC ......... H04B 1/0483 (2013.01); H04B 1/0475 (2013.01); H04B 1/525 (2013.01); H04B 1/7115 (2013.01)

(58) Field of Classification Search
CPC .......... H04B 1/02; H04B 1/04; H04B 1/0475; H04B 1/0483; H04B 1/06; H04B 1/10; H04B 2001/1063; H04B 1/16; H04B 1/38; H04B 1/40; H04B 1/525; H04B 1/711; H04B 1/7115
See application file for complete search history.

(56) References Cited

U.S. PATENT DOCUMENTS

| 7,330,506 B2 * | 2/2008 | Gorecki | ............ H04L 25/03038 |
| | | | 375/232 |
| 8,923,708 B2 * | 12/2014 | Tanimura | ........... H04B 10/6162 |
| | | | 398/209 |
| 9,722,819 B2 * | 8/2017 | Akita | ........................ H04B 3/04 |
| 10,027,367 B2 * | 7/2018 | Heiskanen | ............... H04B 1/44 |
| 2021/0305976 A1 | 9/2021 | Ishii | |

FOREIGN PATENT DOCUMENTS

EP　　　　　3133787 A　　　2/2014

OTHER PUBLICATIONS

International Search Report in corresponding PCT Application No. PCT/US2023030460, mailed Nov. 29, 203.

* cited by examiner

*Primary Examiner* — Quochien B Vuong
(74) *Attorney, Agent, or Firm* — Xianghui Huang; Frank D. Cimino

(57)　　　　　　ABSTRACT

In an example, a circuit includes a first signal path including a first filter having a first number of taps and having an input and an output. The circuit also includes a combiner having first and second inputs, the first input coupled to the output of the first filter. The circuit includes a second signal path coupled to the input of the first filter and to the second input of the combiner. The second signal path includes a gain component, a delay component coupled to the gain component, and a second filter having a second number of taps and coupled to the delay component.

26 Claims, 4 Drawing Sheets

VARIABLE DELAY FIR FILTER FOR REFLECTION EQUALIZATION

CROSS-REFERENCE TO RELATED APPLICATION

This application claims priority to U.S. Provisional Patent Application No. 63/398,948 which was filed Aug. 18, 2022, is titled "VARIABLE DELAY FIR FILTER FOR REFLECTION EQUALIZATION," and is hereby incorporated herein by reference in its entirety.

BACKGROUND

High speed data converters convert analog signals to digital signals or vice versa. Data converters are useful for providing or receiving analog signals across transmission lines to or from a destination. Impedance mismatches often occur at electrical interfaces, such as where a transmission cable is coupled to a connector. Impedance mismatches may cause standing waves to develop that cause frequency ripple, which degrades the quality of the analog signal. One solution to equalize the ripple is to filter the data signal, such as with a finite impulse response (FIR) filter or an infinite impulse response (IIR) filter.

SUMMARY

In accordance with at least one example of the description, a circuit includes a first signal path including a first filter having a first number of taps and having an input and an output. The circuit also includes a combiner having first and second inputs, the first input coupled to the output of the first filter. The circuit includes a second signal path coupled to the input of the first filter and to the second input of the combiner. The second signal path includes a gain component, a delay component coupled to the gain component, and a second filter having a second number of taps and coupled to the delay component.

In accordance with at least one example of the description, a circuit includes a first filter having a first number of taps and having an input and an output. The circuit also includes a combiner having first and second inputs, the first input coupled to the output of the first filter. The circuit includes a second filter having a second number of taps. The circuit also includes a gain component having an input coupled to the input of the first filter and having an output. The circuit includes a delay component having an input coupled to the output of the gain component and having an output, where the second filter has an input coupled to the output of the delay component, and where the second filter has an output coupled to the second input of the combiner. The circuit also includes a digital-to-analog converter having an input coupled to an output of the combiner.

In accordance with at least one example of the description, a circuit includes a first filter having a first number of taps and having an input and an output. The circuit includes a combiner having first and second inputs, the first input coupled to the output of the first filter. The circuit also includes a second filter having a second number of taps and having an input coupled to the input of the first filter and having an output. The circuit includes a delay component having an input coupled to the output of the second filter and having an output. The circuit also includes a gain component having an input coupled to the output of the delay component and having an output coupled to the second input of the combiner. The circuit includes an analog-to-digital converter having an output coupled to the input of the first filter.

In accordance with at least one example of the description, a circuit includes a first filter having a first number of taps and having an input and an output. The circuit includes a first combiner having first and second inputs, the first input coupled to the output of the first filter. The circuit also includes a second filter having a second number of taps. The circuit includes a first gain component having an input coupled to the input of the first filter and having an output. The circuit also includes a first delay component having an input coupled to the output of the first gain component and having an output, where the second filter has an input coupled to the output of the first delay component, and where the second filter has an output coupled to the second input of the first combiner. The circuit includes a digital-to-analog converter having an input coupled to an output of the first combiner. The circuit also includes a third filter having a third number of taps and having an input and an output. The circuit includes a second combiner having first and second inputs, the first input coupled to the output of the third filter. The circuit also includes a fourth filter having a fourth number of taps and having an input coupled to the input of the third filter and having an output. The circuit includes a second delay component having an input coupled to the output of the fourth filter and having an output. The circuit also includes a second gain component having an input coupled to the output of the second delay component and having an output coupled to the second input of the second combiner. The circuit includes an analog-to-digital converter having an output coupled to the input of the third filter.

BRIEF DESCRIPTION OF THE DRAWINGS

The same reference numbers or other reference designators are used in the drawings to designate the same or similar (functionally and/or structurally) features.

DETAILED DESCRIPTION

Figure 1:
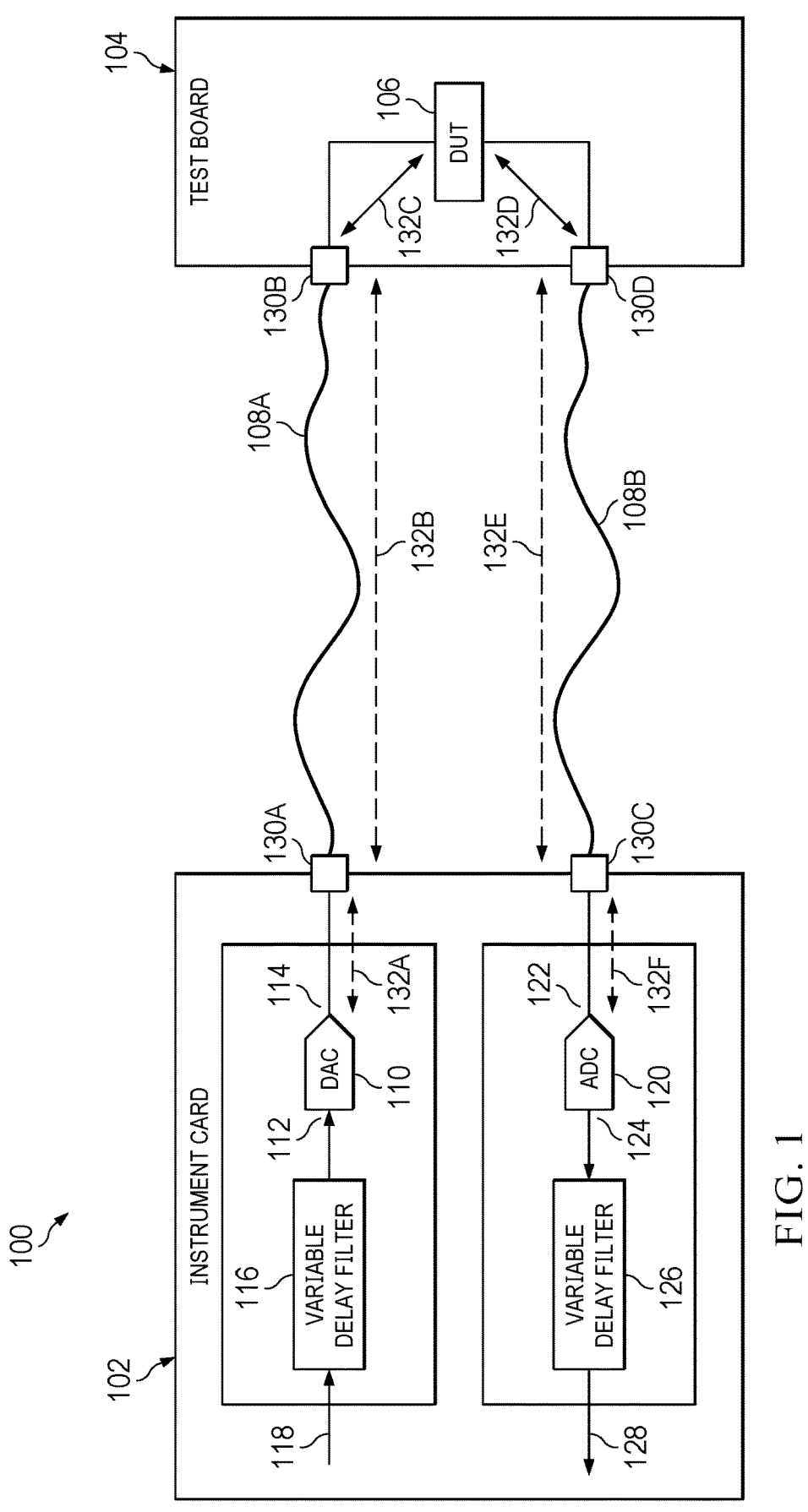
FIG. 1 is a block diagram of an example system with variable delay FIR filters.

Data converters, such as an analog to digital converter (ADC) or a digital to analog converter (DAC), convert signals for use or transmission in a variety of applications. Signal processing is performed on the signals to optimize transmissions, correct errors or distortion, or detect a component within the signal. Digital signals are a sequence of numbers that represent samples of a continuous variable in a domain such as time, space, or frequency. A digital signal is represented as a pulse train, where the pulse train includes the samples of the signal. Digital signals may be filtered with a FIR filter. A FIR filter is a filter whose impulse response is of finite duration, because it settles to zero in finite time. A FIR filter of order N includes an N-stage delay line with $N+1$ taps. An integer value N of delay elements are coupled in series and are configured to receive the samples of the digital signal.

In one example, the N delay elements are implemented with registers or shift registers that make up the delay line.

The taps of the filter tap into the delay line between the N delay elements and receive the samples as the samples traverse the delay line. Each of the N+1 taps performs a multiplication operation on each of the samples as the samples are received by the tap, where each sample is multiplied by a coefficient. The FIR filter produces an output sequence that is a sum (e.g., an accumulation) of the multiplication operations. Digital hardware performs the multiplication and accumulation operations. The FIR filter is designed to have a specific response via selection of the order N, the number of taps, and the coefficients of the multiplication operations performed by the taps. FIR filter design may consider many factors, including bandwidth, sharpness of the response, speed, area, hardware complexity, precision, available computational power, etc.

Signals may traverse a transmission medium, such as a cable. Transmission mediums herein are referred to as paths or signal paths. The paths or signal paths may include cables, wires, traces, conductors, or any other medium for transmitting an electrical signal. A cable may connect one component to another via interfaces at each end of the cable. The signal may also cross other interfaces, such as where the output of one component (such as a DAC) is coupled to another component (such as a connector). Impedance mismatch at these interfaces may cause reflections. Multiple interfaces with impedance mismatches may cause standing waves to develop in the transmission medium. The standing waves cause frequency ripple across the bandwidth of the signal, which degrades the quality of the signal.

One solution to flatten the ripple is to use a single FIR filter on the digital signal before or after conversion from the analog domain, where the FIR filter is designed to have an opposite response to the ripple. However, the length of the digital filter increases as the length of the transmission medium increases and/or as the number of digital samples increase (e.g., as the speed of the data converter increases). Therefore, for high speed data converters, such as 64 giga samples per second (GSPS) data converters, the filter requires a large number of taps. Each FIR tap includes a multiply/accumulate digital function to perform the multiplication and addition operations described above, so more FIR taps require more silicon area, power, and computation time.

In examples herein, instead of using one large FIR filter to flatten the ripple, multiple filters with delays are implemented. The incoming digital signal traverses both a main path and one or more parallel delayed equalization paths (also referred to herein as delayed reflection equalization paths). The main path includes a FIR filter that filters the digital signal. Each delayed equalization path includes a gain circuit (also referred to herein as a gain component), a variable integer sample delay (e.g., a shift register, which is also referred to as a delay component herein), and a FIR filter. The variable integer sample delay operates to delay each of the samples of the digital signal based on the delay of a particular reflection, without performing multiplications on the signal. The reflections are delayed due to the time it takes for the digital signal to traverse the various cables and signal paths in the system, and then get reflected back. The variable integer sample delay is designed to delay the samples of the digital signal by a certain amount of time in each delayed equalization path. Each variable integer sample delay is designed to have a specific delay based on the delay of the reflection. Accordingly, the output of the FIR filter in the delayed equalization path produces a signal that compensates for or cancels the reflection as the reflection is later received.

In an example, a delayed equalization path with a FIR filter is included for each reflection of the digital signal. As described above, the delay in a delayed equalization path matches the delay for the corresponding reflection. In some examples, the digital signal is scaled in the delayed equalization paths because the reflections are smaller than the full signal. Scaling the signal allows for lower resolution in the filter taps in the delayed equalization paths. For example, a smaller signal can be represented with fewer bits (e.g., lower resolution) in the filter taps than a larger signal. By scaling the signal down, fewer bits are needed to represent the results of the multiplication and accumulation operations that are performed on the digital samples of the signal as described above. Because the signal is scaled down, total noise in the signal (e.g., the noise floor) is also reduced proportionally. The examples described herein with multiple smaller FIR filters are more efficient than one large FIR filter. The variable integer sample delay (e.g., the delay component) is simpler to implement than the large number of FIR taps that would be implemented in one large FIR filter. Also, the FIR filters may have reduced tap coefficient resolution away from the centers of the FIR filters. In some examples, IIR filters are used instead of or in addition to FIR filters.

In some examples, the delay is a fractional value and is therefore not exactly an integer value of samples (e.g., a delay of 10.5 samples is needed). In that case, the variable integer sample delay provides a delay equal to an integer number of samples (e.g., 10 samples). For the rest of the delay, the fractional portion (e.g., 0.5 samples) is provided by the N delay elements in the FIR filter, as described above. The N delay elements within the FIR filter are designed to provide the fraction delay value.

FIG. 1 is a block diagram of a system 100 with one or more variable delay FIR filters in accordance with various examples herein. System 100 represents a testing environment, where digital signals are transmitted to and received from a device for testing. However, examples herein are implemented in systems other than testing environments. For example, a variable delay FIR filter as described herein can filter reflections caused by signals transmitted over traces or wires to and from a processor or controller embodied in an integrated circuit.

System 100 includes an instrument card 102 coupled to a test board 104. Test board 104 includes a device under test (DUT) 106. DUT 106 is any electronic device being tested using a setup similar to system 100, such as a microprocessor, controller, or radio frequency transceiver. Instrument card 102 is coupled to test board 104 via cables 108A and 108B (collectively, cables 108). Two cables 108 are shown in system 100, but any number of cables 108 are present in other examples. Instrument card 102 includes a DAC 110 having a DAC input 112 and a DAC output 114, a variable delay filter 116, an ADC 120 having an ADC input 122 and an ADC output 124, and a variable delay filter 126. An output of the variable delay filter 116 is coupled to DAC input 112. An input signal path 118 provides a digital signal to an input of the variable delay filter 116. A signal path is any cable, conductor, trace, wire, or other medium that transmits an electrical signal. Signal paths are also referred to as paths herein. An input of the variable delay filter 126 is coupled to ADC output 124. Variable delay filter 126 provides an output signal, at its output, to an output signal path 128. The elements in instrument card 102 may be embodied in analog hardware, digital hardware, and/or embodied in an integrated circuit.

System 100 also includes connectors 130A, 130B, 130C, and 130D (collectively, connectors 130). Connectors 130 couple cables 108 to other components, such as instrument card 102 and/or test board 104. In this example, connector 130A couples cable 108A to instrument card 102, namely to DAC output 114. Connector 130B couples cable 108A to test board 104, namely to an input of the DUT 106. Connector 130C couples cable 108B to the instrument card 102, namely to ADC input 122. Connector 130D couples cable 108B to the test board 104, namely to an output of the DUT 106.

In operation, a digital signal is provided to instrument card 102 via input signal path 118. The digital signal is filtered by variable delay filter 116. The details and operation of variable delay filter 116 are described below. The filtered digital signal is provided to DAC 110 via DAC input 112. The output signal of DAC 110 is provided to DUT 106 via cable 108A. DUT 106 receives the signal and may provide an output signal in response, which is received by ADC 120 via cable 108B. In another example, DUT 106 generates a signal and provide that signal to the ADC 120. ADC 120 provides a digital signal to variable delay filter 126 via ADC output 124. Variable delay filter 126 provides an output signal via output signal path 128. The output signal is analyzed to test the operation of DUT 106.

Delays are created by the signal paths (also referred to as paths) in system 100. Delays represent signal propagation delays between components of system 100, such as due to impedance mismatches between components that may cause ripples in signals, as described above. A number of potential delays 132 are shown in system 100 (collectively, delays 132, or individually, delay 132). Delays 132A, 132B, 132C, 132D, 132E, and 132F are shown, but other delays 132 may also exist in system 100, such as delays 132 inside components. Each of the delays 132 represents a different delay experienced by a signal as the signal propagates through the system 100.

Delay 132A is the delay along the path between DAC 110 and connector 130A. Delay 132B is the delay along the path between connector 130A and connector 130B (e.g., the delay caused by cable 108A). Delay 132C is the delay between connector 130B and DUT 106. Delay 132D is the delay between DUT 106 and connector 130D. Delay 132E is the delay between connectors 130C and 130D (e.g., the delay caused by cable 108B). Delay 132F is the delay between connector 130C and ADC 120.

Each delay 132, and other delays 132 not shown, may create reflections that cause a standing wave to develop in the signals transmitted in system 100, which creates a frequency dependent ripple in the signal. The variable delay filters 116 and 126 include components that mitigate such ripples. For example, the variable delay filters 116 and 126 include a different delayed equalization path for each delay in system 100. Each of the delayed equalization paths includes a gain component, a variable integer sample delay (also referred to as a delay or a delay component), and a FIR filter with a specific number of taps. The FIR filter is a programmable FIR filter in some examples, or an IIR in other examples. The variable integer sample delay delays the timing of the samples of the input digital signal to match the time that the reflection associated with the corresponding delayed equalization path reaches the variable delay filter. The gain component scales the signal, as the reflections are often a smaller size than the full input signal. Appropriate tap coefficients are also selected for each FIR filter, to filter the ripple in the signal.

Figure 2:
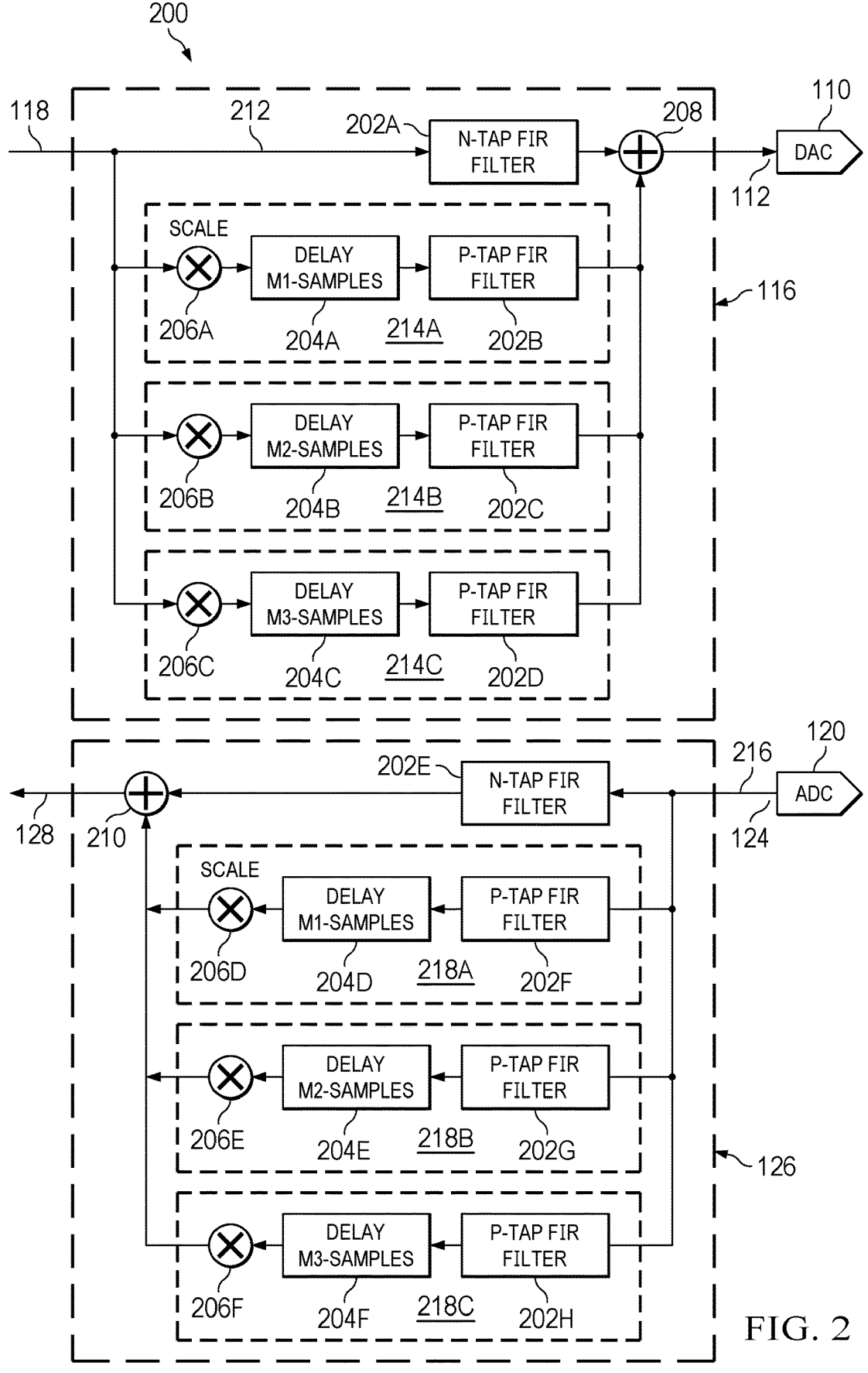
FIG. 2 is block diagram of an example circuit with delayed equalization paths.

FIG. 2 is a block diagram of an example circuit 200, which represents portions of the instrumentation card 102 of system 100. Circuit 200 includes example delayed equalization paths. More specifically, FIG. 2 shows example contents of the variable delay filters 116 and 126 of FIG. 1 coupled, respectively, to DAC 110 and ADC 120. The example variable delay filter 116 includes a first (or main) signal path 212 and three delayed equalization paths 214A, 214B, and 214C. Similarly, the example variable delay filter 126 includes a second signal path 216 and three delayed equalization paths 218A, 218B, and 218C. Different numbers of delayed equalization paths are useful in other examples. The delayed equalization paths may also be referred to as paths or signal paths herein.

The first signal path 212 includes an N-tap FIR filter 202A, where N is an integer that represents the number of taps in the FIR filter. In one example, N is 40 taps in FIR filter 202A. The delayed equalization path 214A includes a gain component 206A, a delay 204A, and a P-tap FIR filter 202B, where P is an integer that represents the number of taps in the FIR filter. The delayed equalization path 214B includes a gain component 206B, a delay 204B, and a P-tap FIR filter 202C. The delayed equalization path 214C includes a gain component 206C, a delay 204C, and a P-tap FIR filter 202D.

Similarly, the second signal path 216 includes an N-tap FIR filter 202E. In one example, N is 40 taps in FIR filter 202E. The delayed equalization path 218A includes a P-tap FIR filter 202F, a delay 204D, and a gain component 206D. The delayed equalization path 218B includes a P-tap FIR filter 202G, a delay 204E, and a gain component 206E. The delayed equalization path 218C includes a P-tap FIR filter 202H, a delay 204F, and a gain component 206F.

Collectively, the FIR filters 202A-202H are referred to as FIR filters 202. The delays 204A-204F are referred to as delays 204. The gain components 206A-206F are referred to as gain components 206. The input signal path 118 is coupled to inputs of gain components 206A-206C and an input of FIR filter 202A. The outputs of FIR filters 202A-202D are coupled to inputs of a combiner 208. Combiner 208 has first and second inputs in this example. The outputs of gain components 206D-206F and the output of FIR filter 202E are coupled to inputs of a combiner 210. Combiner 210 has first and second inputs in this example. The output of the combiner 208 is coupled to DAC input 112 of DAC 110. The ADC output 124 of ADC 120 is coupled to inputs of the FIR filters 202E-202H. The output of the combiner 210 is coupled to the output signal path 128.

In some examples, the FIR filters 202, delays 204, and gain components 206 are hardware components. FIR filters 202 are configured to filter the digital signal to compensate for some interference, standing wave, reflection, or unwanted response in the digital signal. FIR filters 202 are implemented in digital hardware in one example, and include registers, multipliers, and accumulators as described above. Each delay 204 is a shift register or FIFO (first in first out) component in some examples. Delays 204 are configured to delay a digital signal by an integer number of samples (e.g., M1 samples, M2 samples, etc.) of the digital signal. Accordingly, the delay 204 stores the samples of an incoming digital signal and then releases the samples at a later time to match the timing of the reflection, where the reflection is caused by the digital signal traveling through the various paths in system 100. Delays 204 may be located either before or after FIR filters 202 in the delayed equalization paths 214 or 218. Each gain component 206 is a digital multiplier or bit shifter in some examples, or any other circuitry that scales the digital signal up or down. Also, gain components 206 may be located either before or after FIR filters 202.

In an example operation, a digital signal is received via input signal path 118. First signal path 212 provides the digital signal to DAC 110. First signal path 212 includes an N-tap FIR filter 202A. In this example, N is any integer that represents the number of taps in FIR filter 202A. The entire input digital signal traverses both the main path (first signal path 212) and each of the one or more delayed equalization paths 214. That is, each path receives the entire input digital signal and then scales, filters, and/or delays the input digital signal as provided by the components in that respective path.

The first delayed equalization path 214A includes a gain component 206A, a delay 204A, and a P-tap FIR filter 202B, where P is an integer that represents the numbers of taps in the FIR filter 202B. In one example, P is 20 taps in FIR filter 202B. The value of gain component 206A, delay 204A (e.g., M1 samples, where M1 is the number of digital samples that the signal is delayed), the number of taps P in the FIR filter, and the values of the tap coefficients in the FIR filter 202B are selected to compensate for a specific reflection of the signal caused by one of the delays 132. To select these variables and design the components in system 100, a test digital signal is transmitted through system 100 and reflections, standing waves, and other interferences are measured. The reflections and interferences are created by the physical components of system 100, such as cables, connectors, etc. The FIR filters are designed to compensate for these reflections based on the size and delay of the reflections.

For example, delay 132B (shown in FIG. 1) may create a standing wave in the signal caused by cable 108A. First delayed equalization path 214A may compensate for this standing wave caused by delay 132B by providing an opposite response to the standing wave. Each delayed equalization path 214 and 218 is designed, in this example, to compensate for a particular reflection or other interference in this particular system. If the system 100 is changed or altered (such as by replacing a cable), testing is performed again and the filters are modified to compensate for the reflections caused by the new components in system 100.

The second delayed equalization path 214B includes a gain component 206B, a delay 204B, and a P-tap FIR filter 202C. The value of gain component 206B, delay 204B (e.g., M2 samples), the number of taps P, and the values of the tap coefficients in the P-tap FIR filter 202C are selected to compensate for a specific reflection of the signal caused by one of the delays 132. The number of taps P and the values of the tap coefficients in P-tap FIR filter 202C are different than the number of taps P and the values of the tap coefficients in P-tap FIR filter 202B in one example. In one example, P is 20 taps in FIR filter 202C, but P could be any other number of taps, such as 16, 18, or 22 taps. Also, the amount of gain provided by gain component 206B and the length of the delay provided by delay 204B may be different than the gain and delay of these respective components found in first delayed equalization path 214A. The amount of gain and the length of the delay in each delayed equalization path 214 are designed to compensate for a specific reflection of the signal.

The third delayed equalization path 214C includes a gain component 206C, a delay 204C, and a P-tap FIR filter 202D. The value of gain component 206C, delay 204C (e.g., M3 samples), the number of taps P, and the values of the tap coefficients in the P-tap FIR filter 202D are selected to compensate for a specific reflection of the signal caused by one of the delays 132. The number of taps P and the values of the tap coefficients in P-tap FIR filter 202D may be different than the number of taps P and tap coefficients in P-tap FIR filter 202B or in P-tap FIR filter 202C. The amount of gain provided by gain component 206C and the length of the delay provided by delay 204C may also be different than the gain and delay of these respective components found in first delayed equalization path 214A or second delayed equalization path 214B.

Delayed equalization paths 214 and 218 (described below) are structured to compensate for the delays 132 shown in system 100 in FIG. 1. Any number of delayed equalization paths 214 or 218 may be created. The signals produced by delayed equalization paths 214A, 214B, and 214C are combined with the signal from first signal path 212 at combiner 208, and the combined signal is then provided to DAC 110 at DAC input 112. DAC 110 then sends the signal to a DUT 106 as shown in FIG. 1 and described above, or to any other component or device in other examples.

In some examples, IIR filters are used rather than FIR filters 202. In a FIR filter, the impulse response goes to zero in a finite period of time. IIR filters, however, use internal feedback so the IIR filter operates for an indefinite period of time. The feedback in an IIR filter considers past output samples, whereas a FIR filter has no feedback and considers only past and present input samples. FIR filters are generally more stable and easier to implement than IIR filters. FIR filters have a linear phase response, while IIR filters have a non-linear phase response. However, IIR filters are often faster and use less memory space than FIR filters.

Circuit 200 includes a second signal path 216 and ADC 120 that is coupled to three delayed equalization paths 218. In an example, ADC 120 receives a signal from a DUT 106 via a cable 108B. The signal that reaches ADC 120 may have a number of standing waves or ripples caused by delays 132D, 132E, and/or 132F. The filters 202 and delayed equalization paths 218 coupled to ADC 120 compensate for these ripples or reflections. As an example, ADC 120 sends a signal via second signal path 216 to N-tap FIR filter 202E. N is any integer, and may be a different value than the N in N-tap FIR filter 202A.

Delayed equalization paths 218A, 218B, and 218C are paths coupled to ADC 120 that receive the signal from second signal path 216 and operate similarly to delayed equalization paths 214A, 214B, and 214C described above. The first delayed equalization path 218A includes a gain component 206D, a delay 204D, and a P-tap FIR filter 202F. The value of gain component 206D, delay 204D (e.g., M1 samples), the number of taps P, and the values of the tap coefficients in the P-tap FIR filter 202F are selected to compensate for a specific reflection of the signal caused by a delay 132. The number of taps P and the values of the tap coefficients in P-tap FIR filter 202F may be different than the number of taps P and the values of the tap coefficients in P-tap FIR filter 202B, 202C, or 202D. As an example, delay 132E (shown in FIG. 1) creates a standing wave in the signal caused by cable 108B that couples DUT 106 to ADC 120. First delayed equalization path 218A compensates for this standing wave caused by delay 132E.

The second delayed equalization path 218B includes a gain component 206E, a delay 204E, and a P-tap FIR filter 202G. The value of gain component 206E, delay 204E (e.g., M2 samples), the number of taps P, and the values of the tap coefficients in the P-tap FIR filter 202G are selected to compensate for a specific reflection of the signal caused by a delay 132. The number of taps P and the values of the tap coefficients in P-tap FIR filter 202G may be different than the number of taps P and the values of the tap coefficients in other P-tap FIR filters 202. The amount of gain provided by gain component 206E and the length of the delay provided by delay 204E may also be different than the gain and delay of these respective components found in first delayed equalization path 218A.

The third delayed equalization path 218C includes a gain component 206F, a delay 204F, and a P-tap FIR filter 202H. The value of gain component 206F, delay 204F (e.g., M3 samples), the number of taps P, and the values of the tap coefficients in the P-tap FIR filter 202H are selected to compensate for a specific reflection of the signal caused by a delay 132. The number of taps P and the values of the tap coefficients in P-tap FIR filter 202H may be different than the number of taps P and the values of the tap coefficients in other P-tap FIR filters 202. The amount of gain provided by gain component 206F and the length of the delay provided by delay 204F may also be different than the gain and delay of these respective components found in first delayed equalization path 218A or second delayed equalization path 218B.

The signals produced by delayed equalization paths 218A, 218B, and 218C are combined with the signal from second signal path 216 at combiner 210, and the combined signal is then provided to output signal path 128. The combined signal is then processed by any suitable system, processor, or controller (not shown in FIG. 2). The example delayed equalization paths 214 and 218 described herein operate to remove or compensate for standing waves caused by delays 132 in system 100.

In examples described herein, the use of delayed equalization paths 214 and 218 rather than a single large filter reduces the number of FIR taps in the system. As described above, taps require silicon area, power, and computation time. For example, a full programmable FIR filter has approximately 640 taps in the example of a 64 GSPS data converter, whereas the FIR filters 202 have approximately 20 taps each in some examples. Therefore, delay paths with smaller FIR filters provide large area and computation savings, while still compensating for the reflections in the system as well as or better than the full programmable FIR filter. Also, FIR filters 202 that filter reflections have reduced tap coefficient resolutions away from the center peak of the reflection. With a full programmable FIR filter, full resolution is needed for all tap coefficients, because the location of the center peak of the signal is unknown. Full resolution for all tap coefficients requires higher silicon area and power. Lower coefficient resolutions have fewer bits to multiply to implement the filter, which reduces hardware area and power consumption. In one example, a system such as the system in FIG. 2 has 394 total coefficient bits. A full programmable FIR filter has 640 taps in the example of a 64 GSPS data converter. In another example, a full programmable FIR filter has 16 coefficient bits for each tap. A system with 100 taps would therefore have 1600 bits; a system with 200 taps would have 3200 bits, etc.

Figure 3:
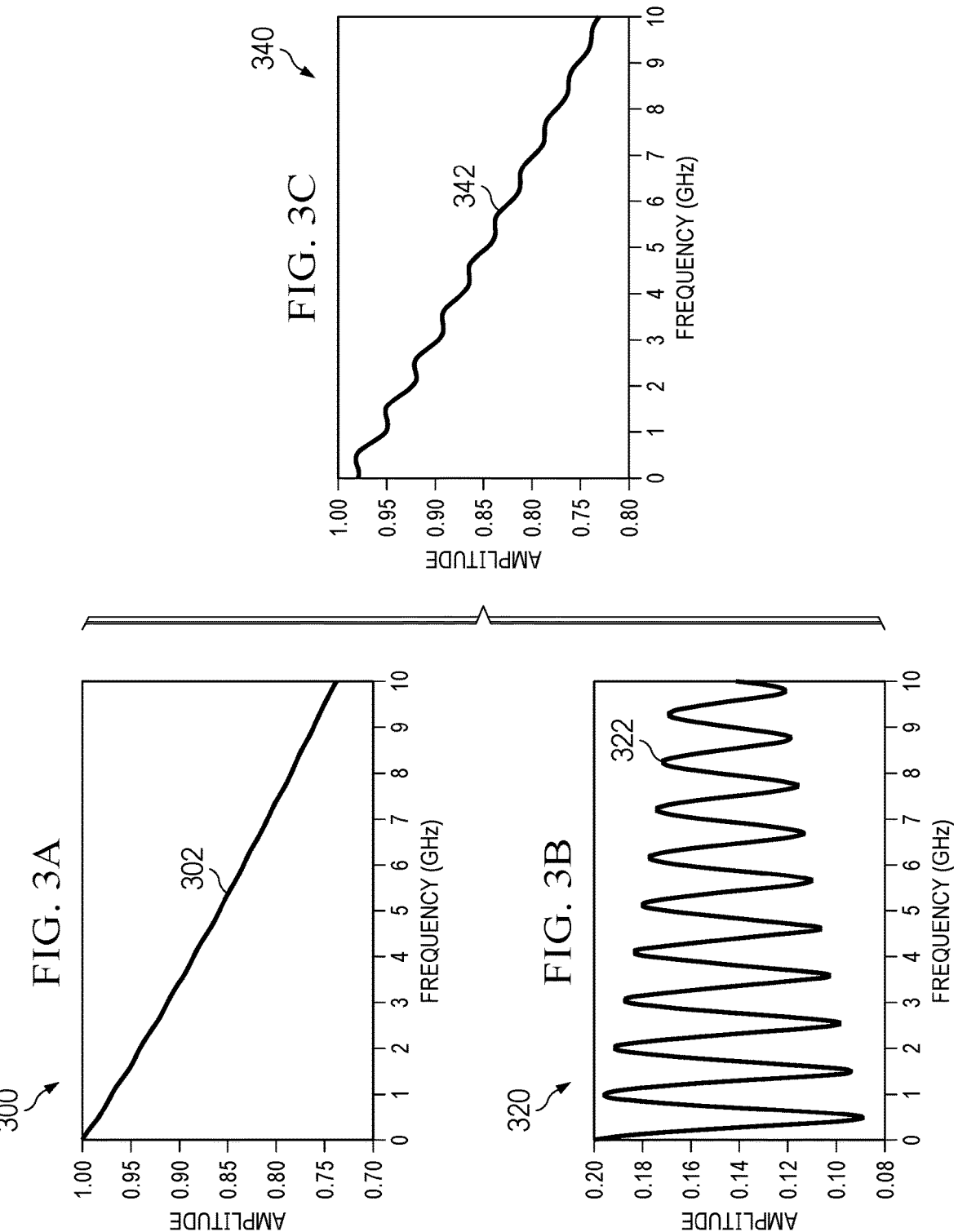
FIGS. 3A, 3B, and 3C are example graphs of frequency domain responses for a cable response and a standing wave.

FIGS. 3A to 3C are graphs of frequency domain responses for a cable response and a standing wave in accordance with various examples herein. In each of FIGS. 3A to 3C, the x-axis represents frequency in gigahertz (GHz) and the y-axis represents amplitude of the signal. The waveforms shown in FIGS. 3A to 3C are examples and may be different in other systems.

FIG. 3A is a graph 300 that includes a waveform 302. Waveform 302 represents the response of a cable that transmits a signal in one example. Waveform 302 shows the amplitude of the response dropping as frequency increases. FIG. 3B is a graph 320 that includes a waveform 322.

Waveform 322 represents a ripple caused by a standing wave in the cable in one example. Waveform 322 also loses amplitude as frequency increases. The standing wave represented by waveform 322 is reflected back to other components, such as DAC 110 or ADC 120, as described above.

FIG. 3C is a graph 340 that shows a combination waveform 342 that includes both waveform 302 and waveform 322. Waveform 342 shows a small ripple and a gradual decrease in amplitude as frequency increases. Waveform 342 shows a signal without any equalization. In examples herein, equalization is performed to compensate for waveform 342. As one example, the filtering in first signal path 212 in FIG. 2 compensates for waveform 302, and the filtering in a delayed equalization path 214A compensates for waveform 322. When the filters on these paths are combined with filters and paths for other standing waves, all of the standing waves and the cable response are compensated for in the system, as described above with respect to FIG. 2.

Figure 4:
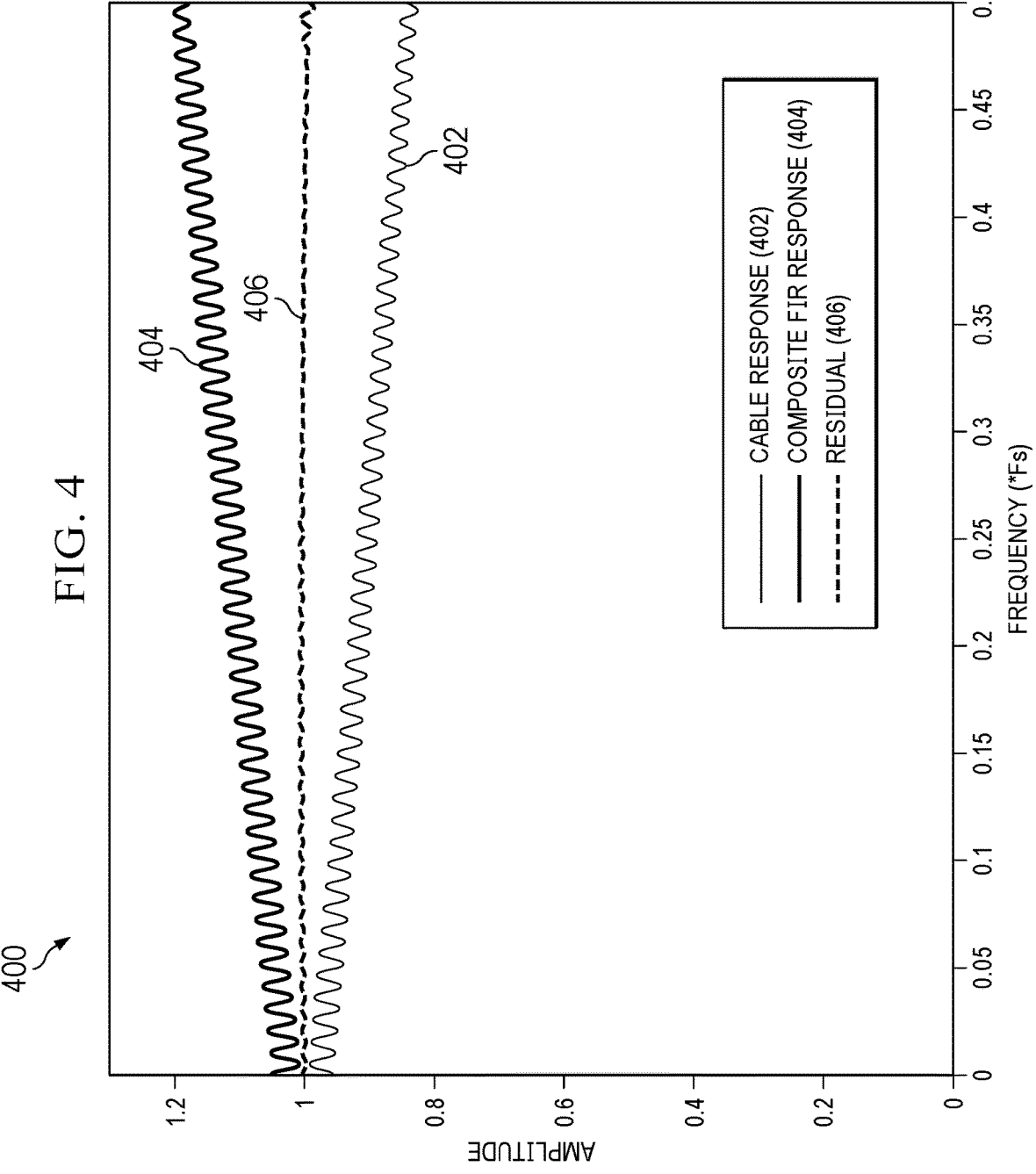
FIG. 4 is an example graph of frequency domain response for a FIR filter.

FIG. 4 is a graph 400 of frequency domain response for FIR filters in accordance with various examples herein. In graph 400, the x-axis represents the multiple of the frequency of the sampling rate (Fs) of an ADC (e.g., *Fs), and the y-axis represents amplitude. Graph 400 represents the Nyquist zone between 0 and 0.5 times the sampling rate Fs, where the frequency response is unique. Graph 400 includes three waveforms 402, 404, and 406.

Waveform 402 in graph 400 shows an example cable response or delay response. In this cable response, the amplitude of the signal transmitted by the cable decreases as frequency increases, which is shown as waveform 402 decreasing from left to right. In one example, waveform 402 is waveform 342 described above with respect to FIG. 4C. To counter this cable response, the composite response of the FIR filters is designed to compensate for the declining amplitude of waveform 402. These FIR filters include all of the FIR filters 202 in the system. Therefore, as shown in waveform 404, the composite response of the FIR filters 202 in an example circuit 200 increases as frequency increases.

Waveform 406 is the combination of waveforms 402 and 404. If FIR filters 202 filter the signal to compensate for the cable response (and other delays), the declining amplitude with respect to frequency is removed. Waveform 406 is the result of a signal where FIR filters 202 were designed to compensate for specific delays in a system represented by waveform 402. Waveform 406 is a mostly flat response, which indicates that the composite FIR filter response represented by waveform 404 has compensated for the delays in this example.

In examples herein, instead of using one large FIR filter to flatten the ripple, multiple filters with delays are implemented. The incoming digital signal traverses a main path and one or more parallel delayed equalization paths. A delayed equalization path with a FIR filter may be added for each reflection found in the digital signal. The examples described herein with multiple FIR filters are more efficient than one large FIR filter. The variable integer sample delay is simpler to implement than a large number of FIR taps. Also, the FIR filters have reduced tap coefficient resolution away from the center of the FIR filters. Savings in area and power consumption are realized by some of the examples described herein.

In this description, the term "couple" may cover connections, communications or signal paths that enable a functional relationship consistent with this description. For example, if device A provides a signal to control device B to perform an action, then: (a) in a first example, device A is directly connected to device B; or (b) in a second example, device A is coupled to device B through intervening component C if intervening component C does not alter the functional relationship between device A and device B, so device B is controlled by device A via the control signal provided by device A.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

While certain elements of the described examples are included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

In this description, unless otherwise stated, "about," "approximately" or "substantially" preceding a parameter means being within +/−10 percent of that parameter. Modifications are possible in the described examples, and other examples are possible within the scope of the claims.

What is claimed is:

1. A circuit comprising:
a first signal path including a first filter having a first number of taps and having an input and an output;
a combiner having first and second inputs, the first input coupled to the output of the first filter; and
a second signal path coupled to the input of the first filter and to the second input of the combiner, the second signal path including:
a gain component configured to provide a less than unity gain;
a delay component coupled to the gain component; and
a second filter having a second number of taps and coupled to the delay component, wherein the second number of taps is responsive to the less than unity gain.

2. The circuit of claim 1, wherein the gain component is a first gain component, and the delay component is a first delay component, the circuit further comprising a third signal path coupled to the input of the first filter and to the second input of the combiner, the third signal path including:
a second gain component;
a second delay component coupled to the second gain component; and
a third filter having a third number of taps and coupled to the second delay component.

3. The circuit of claim 2, wherein a delay of the second signal path is configured to match a delay of a first signal reflection, and a delay of the third signal path is configured to match a delay of a second signal reflection.

4. The circuit of claim 1, wherein the second signal path is configured to compensate for a reflection of a digital signal in the circuit.

5. The circuit of claim 4, wherein the gain component is configured to scale the digital signal based on a size of the reflection.

6. The circuit of claim 4, wherein the delay component is configured to delay the digital signal based on a delay of the reflection.

7. The circuit of claim 1, further comprising a digital-to-analog converter having an input coupled to an output of the combiner.

8. The circuit of claim 7, wherein:
the gain component has an input coupled to the input of the first filter and has an output;
the delay component has an input coupled to the output of the gain component and has an output; and
the second filter has an input coupled to the output of the delay component and has an output coupled to the second input of the combiner.

9. The circuit of claim 1, further comprising an analog-to-digital converter having an output coupled to the input of the first filter.

10. The circuit of claim 9, wherein:
the second filter has an input coupled to the input of the first filter and has an output;
the delay component has an input coupled to the output of the second filter and has an output; and
the gain component has an input coupled to the output of the delay component and has an output coupled to the second input of the combiner.

11. The circuit of claim 1, wherein the first filter and the second filter are finite impulse response filters.

12. The circuit of claim 1, wherein the first filter and the second filter are infinite impulse response filters.

13. The circuit of claim 1, wherein the first signal path is a main signal path and corresponds to a unity gain.

14. The circuit of claim 1, wherein the delay component provides a delay equal to an integer number of samples.

15. The circuit of claim 1, wherein the second filter has a reduced tap coefficient resolution away from a center of the second filter.

16. A circuit comprising:
a first filter having a first number of taps and having an input and an output;
a combiner having first and second inputs, the first input coupled to the output of the first filter;
a gain component having an input coupled to the input of the first filter and having an output, the gain component configured to provide a less than unity gain;
a second filter having a second number of taps, wherein the second number of taps is responsive to the less than unity gain;
a delay component having an input coupled to the output of the gain component and having an output, wherein the second filter has an input coupled to the output of the delay component, and wherein the second filter has an output coupled to the second input of the combiner; and
a digital-to-analog converter having an input coupled to an output of the combiner.

17. The circuit of claim 16, wherein the second filter, gain component, and delay component are configured to compensate for a reflection of a digital signal in the circuit.

18. The circuit of claim 17, wherein the gain component is configured to scale the digital signal based on a size of the reflection.

19. The circuit of claim 17, wherein the delay component is configured to delay the digital signal based on a delay of the reflection.

20. The circuit of claim 16, wherein the first filter and the second filter are finite impulse response filters.

21. A circuit comprising:

a first filter having a first number of taps and having an input and an output;

a combiner having first and second inputs, the first input coupled to the output of the first filter;

a delay component having an input and an output;

a gain component having an input coupled to the output of the delay component and having an output coupled to the second input of the combiner, the gain component configured to provide a less than unity gain;

a second filter having a second number of taps and having an input coupled to the input of the first filter and having an output coupled to the input of the delay component, wherein the second number of taps is responsive to the less than unity gain; and an analog-to-digital converter having an output coupled to the input of the first filter.

22. The circuit of claim 21, wherein the second filter, gain component, and delay component are configured to compensate for a reflection of a digital signal in the circuit.

23. The circuit of claim 22, wherein the gain component is configured to scale the digital signal based on a size of the reflection.

24. The circuit of claim 22, wherein the delay component is configured to delay the digital signal based on a delay of the reflection.

25. The circuit of claim 21, wherein the first filter and the second filter are finite impulse response filters.

26. A circuit, comprising:

a first filter having a first number of taps and having an input and an output;

a first combiner having first and second inputs, the first input coupled to the output of the first filter;

a first gain component having an input coupled to the input of the first filter and having an output, the first gain component configured to provide a less than unity gain;

a second filter having a second number of taps, wherein the second number of taps is responsive to the less than unity gain;

a first delay component having an input coupled to the output of the first gain component and having an output, wherein the second filter has an input coupled to the output of the first delay component, and wherein the second filter has an output coupled to the second input of the first combiner;

a digital-to-analog converter having an input coupled to an output of the first combiner;

a third filter having a third number of taps and having an input and an output;

a second combiner having first and second inputs, the first input coupled to the output of the third filter;

a fourth filter having a fourth number of taps and having an input coupled to the input of the third filter and having an output;

a second delay component having an input coupled to the output of the fourth filter and having an output;

a second gain component having an input coupled to the output of the second delay component and having an output coupled to the second input of the second combiner; and an analog-to-digital converter having an output coupled to the input of the third filter.

\* \* \* \* \*